(12) United States Patent
Wang et al.

(10) Patent No.: US 8,925,182 B2
(45) Date of Patent: Jan. 6, 2015

(54) CAST ROTOR AND METHOD

(75) Inventors: Qigui Wang, Rochester Hills, MI (US); Kevin P. Coleman, Livonia, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 428 days.

(21) Appl. No.: 13/275,535

(22) Filed: Oct. 18, 2011

(65) Prior Publication Data
US 2013/0093282 A1    Apr. 18, 2013

(51) Int. Cl.
 H02K 15/14    (2006.01)
 H02K 15/00    (2006.01)

(52) U.S. Cl.
 CPC .................................. *H02K 15/0012* (2013.01)
 USPC ........................................... 29/598; 164/109

(58) Field of Classification Search
 CPC .. H02K 15/0012; H02K 15/02; H02K 17/165
 USPC .......... 29/596–598; 164/103, 112, 312, 6, 15; 310/210–211, 125, 261, 261.1
 See application file for complete search history.

(56) References Cited

U.S. PATENT DOCUMENTS

| | | | |
|---|---|---|---|
| 2,944,171 A | 7/1960 | Schenectady | |
| 3,683,493 A | 8/1972 | Begovich | |
| 3,826,302 A * | 7/1974 | Wunder | 164/312 |
| 4,760,300 A * | 7/1988 | Yoshida et al. | 310/211 |
| 4,843,705 A * | 7/1989 | Aussieker et al. | 29/598 |
| 5,467,521 A * | 11/1995 | Nakamura et al. | 29/598 |
| 5,538,067 A * | 7/1996 | Nakamura et al. | 164/112 |
| 6,786,272 B2 * | 9/2004 | Cowie et al. | 164/103 |
| 2005/0134137 A1 | 6/2005 | Sweo | |

FOREIGN PATENT DOCUMENTS

CN        1146384 A        4/1997

* cited by examiner

*Primary Examiner* — Minh Trinh
(74) *Attorney, Agent, or Firm* — Quinn Law Group, PLLC

(57) ABSTRACT

A method for forming a rotor assembly including a cast rotor frame includes positioning a preheated rotor core defining a plurality of passages in a mold cavity such that the mold cavity and the rotor core define the rotor frame including a plurality of conductor bars defined by the plurality of passages in fluid communication with first and second end portions of the mold cavity. Molten metal is quiescently introduced into the mold cavity through an ingate and simultaneously flowed through the plurality of passages prior to filling at least one of the first and second end portions of the mold cavity to form the cast rotor frame. Entrained air and impurities may be displaced from the passages by the flow of molten metal and vented or entrapped by a biscuit. The rotor frame and conductor bars thus formed may be characterized by high conductivity, negligible porosity, and minimal oxides.

18 Claims, 3 Drawing Sheets

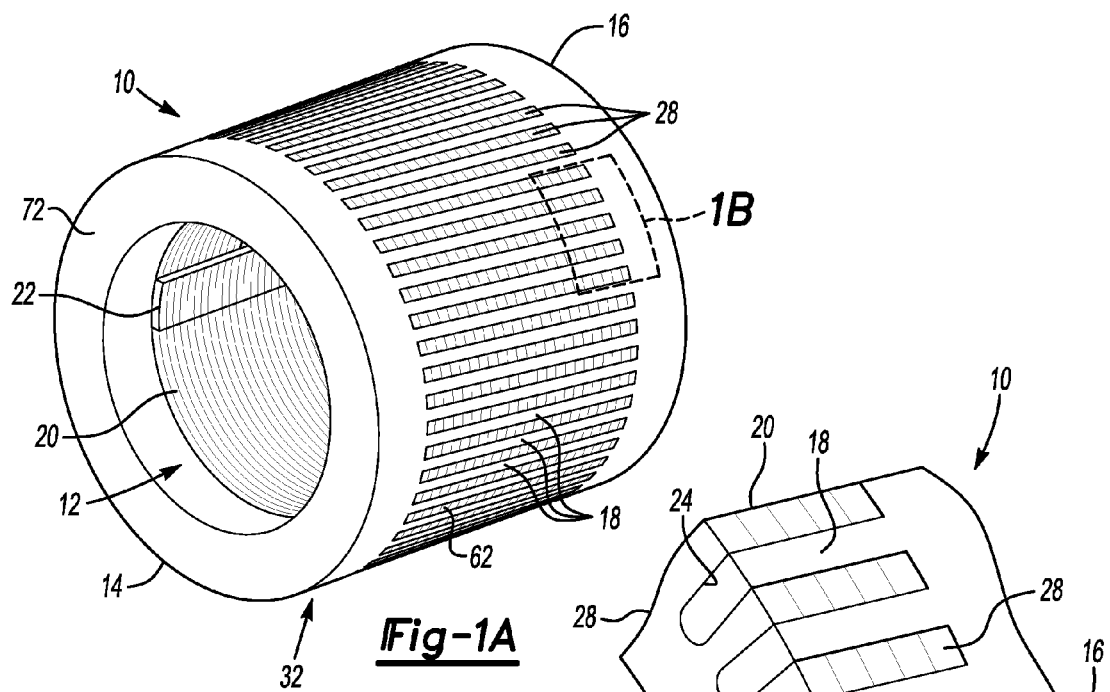
Fig-1A
Fig-1B
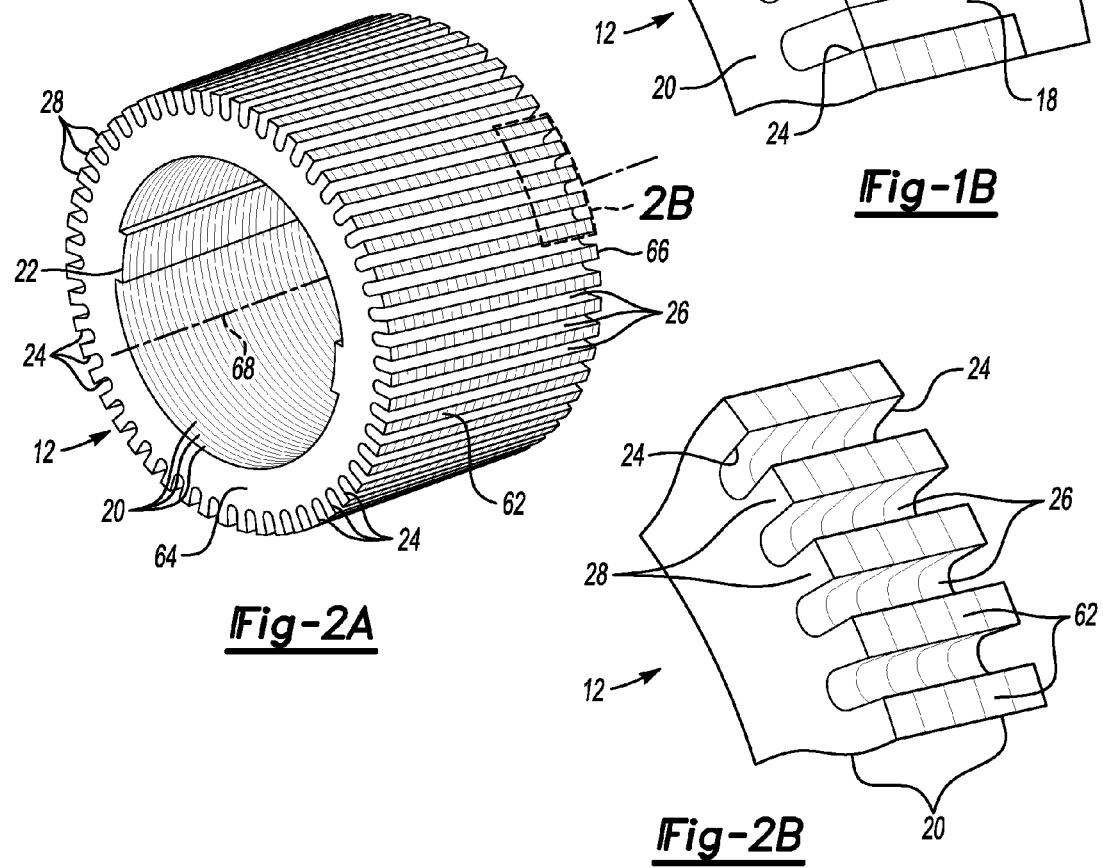
Fig-2A
Fig-2B

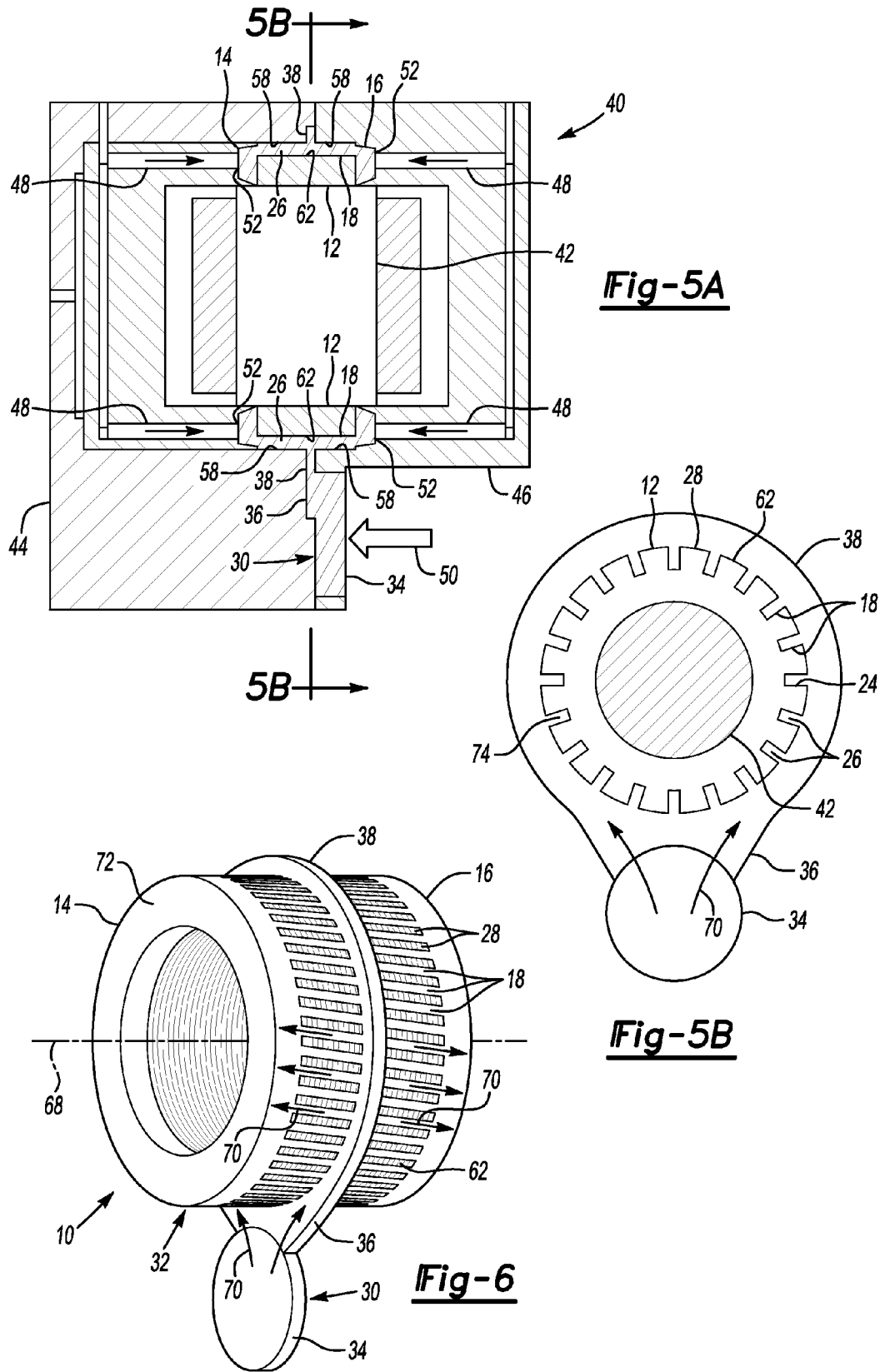

CAST ROTOR AND METHOD

TECHNICAL FIELD

The present invention relates to a rotor including a cast portion.

BACKGROUND

Increasing demands in fuel efficiency has made hybrid systems more attractive in the automotive industry. An electric motor may be an important part of a hybrid system, and may be configured as an alternating current (AC) induction motor including a stator and a rotor. The stator is the outermost component of the motor and is composed of steel laminations including teeth shaped to form poles with copper wire coils wound around the poles to form windings. The primary windings are connected to a voltage source to produce a rotating magnetic field. The rotor is the innermost sub-assembly of the motor and may be composed of a stack of steel laminations including teeth shaped to form poles, which are separated by conductor bars electrically connected to end rings located at opposing ends of the stack. The interaction of currents flowing in the conductor bars of the rotor winding and the stator's rotating magnetic field generates torque.

One method of constructing an aluminum rotor is to cast an aluminum alloy into the slots of the lamination stack while simultaneously casting aluminum end rings to create an electrical circuit, using high pressure die cast (HPDC) methods. This arrangement of cast rotor bars and cast end rings resembles a squirrel cage, leading to the name squirrel-cage induction motor. A major barrier to widespread implementation of HPDC aluminum induction rotor components is the poor integrity of the aluminum cage, also referred to as a rotor frame, formed by the HPDC process. Casting defects observed in the HPDC aluminum rotors such as entrained air bubbles, hot-tearing cracks, knit lines, shrinkage, porosity, and oxide inclusions, for example, can significantly reduce electrical and mechanical performance of the rotor.

In addition, the aluminum alloys used to cast rotor squirrel cages are usually high purity aluminum alloy such as AL99.7 (99.7% pure aluminum having a conductivity of 62% IACS measured using the International Annealed Copper Standard (IACS)), or electric grade wrought alloys which are all difficult to cast because of the low fluidity and high shrinkage rate of these alloys. These characteristics of the higher purity aluminum alloys increase porosity and the tendency for hot tearing or other discontinuities, particularly at the locations where each of the cast conductor bars intersect a casting forming one of the end rings, which can lead to fracture between the conductor bars and the end rings.

Furthermore, the high velocity flow rates of the molten aluminum used to fill the thin long conductor bars (squirrel slots) in the laminate steel stack, which may be up to 60 m/s, produce turbulent fill which tends to entrain mold cavity gas and generate abundant aluminum oxides during the casting process. Turbulent metal fill during HPDC of the end rings and the conductor bars decreases rotor quality and durability and also significantly reduces the thermal and electric conductivity of the rotor frame, particularly in the conductor bars. In practice, the electric conductivity of an aluminum rotor frame (cast conductor bars integrated with cast end rings) formed by current HPDC casting methods may only be about 40 to 45% IACS. The casting defects present in the HPDC aluminum conductor bars may reduce conductivity and significantly affect motor performance.

SUMMARY

A rotor including a cast portion and a method of making the rotor are provided herein. The rotor may be configured for use in an electric motor, which may be an alternating current (AC) induction motor. The electric motor may be included in a hybrid system to power a vehicle. The rotor formed by the method described herein includes a lamination stack, which may also be referred to as a rotor core, and a cast winding, which may also be referred to as a rotor frame or cage. The winding includes a first end ring, a second end ring, and a plurality of conductor bars formed as a single casting such that each of the plurality of conductor bars is electrically connected to the first end ring and to the second end ring. The lamination stack includes a plurality of generally longitudinal passages in which the plurality of conductor bars is cast.

A method for forming the rotor assembly includes preheating the lamination stack to a predetermined temperature and positioning the preheated lamination stack in a mold cavity including a first mold portion defining a first end ring of the rotor frame, a second mold portion defining a second end ring of the rotor frame, and a cavity surface therebetween. The preheated lamination stack is positioned in the mold cavity such that a peripheral surface of the lamination stack including the plurality of passages is in contact with the cavity surface of the mold cavity and the plurality of passages are in fluid communication with the first end portion and the second end portion of the mold cavity to define a plurality of conductor bars of the rotor frame. Molten metal is introduced into the mold cavity quiescently, that is, at a velocity such that turbulent flow of the molten metal in the mold cavity is minimized, and such that the molten metal flows simultaneously through the plurality of passages prior to filling at least one of the first end portion and the second end portion of the mold cavity. The molten metal is solidified to form the rotor frame and rotor assembly.

A vacuum may be applied to the mold cavity prior to introducing molten metal into the mold cavity, which may improve the flow of molten metal through the plurality of passages, and may reduce entrained air and porosity in the rotor frame. The method may include pressurizing the molten metal during solidification of the rotor frame, for example, by using a pressurizing element such as an intensification ring in communication with at least one of the first end portion and the second end portion of the mold cavity.

In one example, the lamination stack may be preheated to a predetermined temperature between 200 degrees Centigrade and 500 degrees Centigrade, and may preferably be preheated to at least 350 degrees Centigrade, before introducing the molten metal into the mold cavity. The predetermined temperature may be sufficiently high to slow the solidification of the molten metal as the molten metal flows through the plurality of passages, by reducing the thermal gradient between the molten metal and the heated rotor core, thereby enhancing the flow of molten metal through the plurality of passages. By preheating the lamination stack to reduce the thermal gradient, shrinkage porosity, discontinuities such as folds, hot tears and cold shuts, and thermal stresses in the conductor bars may be minimized or substantially eliminated. The mold cavity may also be preheated to reduce the thermal gradient between the cavity, core and molten metal to minimize the formation of casting discontinuities and thermal stresses. In one example, the mold cavity and the preheated lamination stack may be heated to be generally at the same temperature when the molten metal is introduced to the mold cavity.

The flow of molten metal through the plurality of passages may displace impurities from the plurality of passages in the lamination stack such that the formation of porosity and oxides in the plurality of conductor bars is minimized. For example, air may be pushed from the plurality of passages and out of the mold cavity by the molten metal to minimize porosity in the cast rotor frame. The air pushed by the molten metal may be vented out of the mold cavity through a vent or overflow which may be in fluid communication with one of a parting line and a pressurizing element, such as an ejection pin or intensification ring, of the mold cavity.

The method may further include forming a biscuit configured to collect entrained air and impurities from the flow of molten metal which may minimize formation of porosity and oxides or other inclusions or discontinuities in the rotor frame. The molten metal may flow through the portion of the mold cavity defining the biscuit prior to flowing into the plurality of passages.

In one embodiment, the method may include flowing the molten metal into a first mold portion of the mold cavity through a ring-type ingate which may include a generally annular opening in fluid communication with the first mold portion, to simultaneously fill the plurality of passages prior to filling the second mold portion of the mold cavity, e.g., prior to forming the second end of the rotor frame. The mold cavity may include a mandrel proximate to the ingate and configured to collect entrained air and oxides from the molten metal in a biscuit defined by a surface of the mandrel. The lamination stack may be positioned on the mandrel. The surface of the mandrel may be of a generally concave and/or conical shape defining a generally convex and/or conical portion of the biscuit, wherein the entrained air and oxides may be collected in the generally convex portion of the biscuit.

In another embodiment, the method may include flowing the molten metal through a ring-type ingate located intermediate between the first end ring portion and the second end ring portion of the mold cavity and in fluid communication with the plurality of passages. The ring-type ingate may include an opening conforming to the peripheral surface of the lamination stack through which the molten metal flows simultaneously into the plurality of passages.

The rotor assembly formed by the method described herein comprises the rotor core, which may be configured as a lamination stack, and the rotor frame, wherein the rotor frame comprises a single casting made of an electric grade alloy. The casting forming the rotor frame includes a first end ring, a second end ring and a plurality of conductor bars. The plurality of conductor bars may be characterized by negligible porosity and minimal oxides such that the rotor frame has improved conductivity and higher mechanical properties including strength and fatigue, as compared with a rotor frame cast by conventional high pressure die casting methods. The rotor assembly as described herein may also demonstrate improved durability and lower manufacturing costs due in part to lower scrap rates, as compared with rotor assemblies including rotor frames cast by conventional high pressure die casting methods.

The above features and other features and advantages of the present invention are readily apparent from the following detailed description of the best modes for carrying out the invention when taken in connection with the accompanying drawings.

BRIEF DESCRIPTION OF THE DRAWINGS

FIG. 1A is a schematic perspective view of a rotor including a cast winding;

FIG. 1B is a partial schematic perspective view of the rotor of FIG. 1A;

FIG. 2A is a schematic perspective view of a lamination stack of the rotor of FIG. 1;

FIG. 2B is a partial schematic perspective view of the lamination stack of FIG. 2A;

FIG. 5A is a schematic cross-sectional view of a second embodiment of a mold configured to cast the rotor of FIG. 1;

FIG. 5B is a schematic cross-section view of the rotor casting and mandrel of the mold configuration of FIG. 5A; and FIG. 6 is a schematic perspective view of the rotor casting formed using the mold of FIG. 5A.

DETAILED DESCRIPTION

Figure 3:
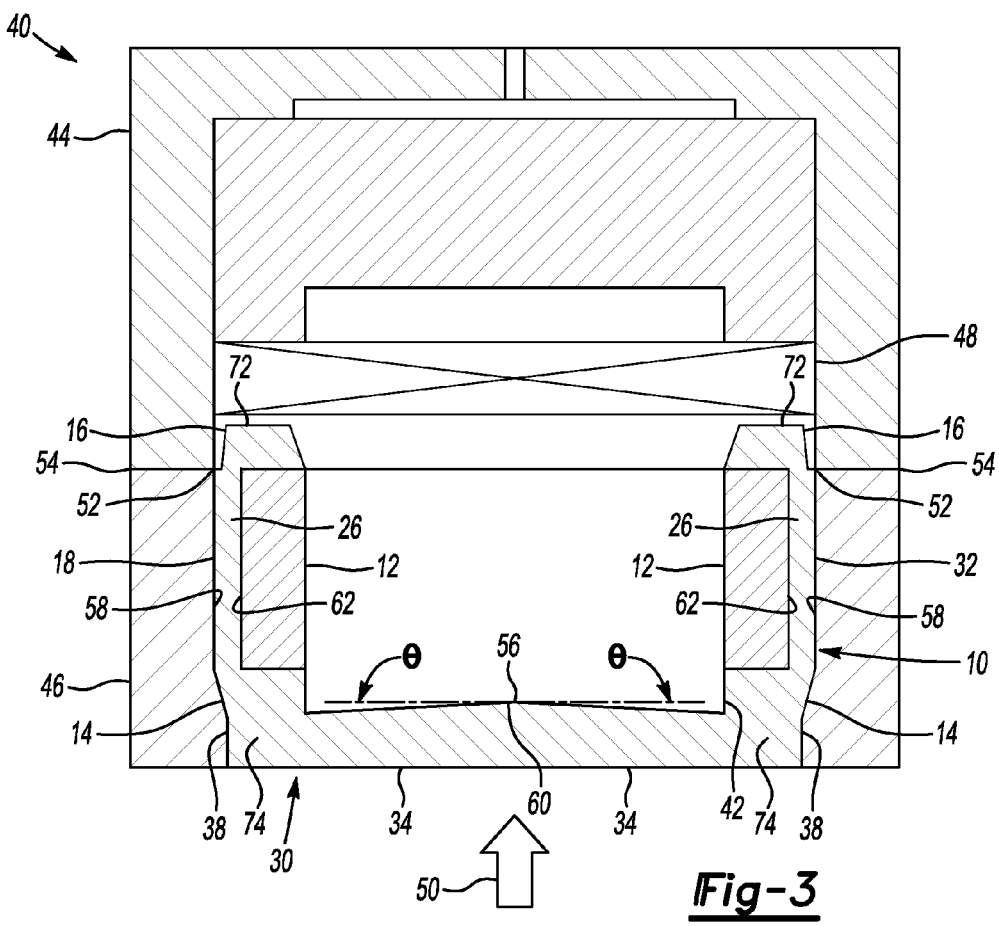
FIG. 3 is a schematic cross-sectional view of a first embodiment of a mold configured to cast the rotor of FIG. 1.

Referring to the drawings wherein like reference numbers represent like components throughout the several figures, the elements shown in FIGS. 1-6 are not necessarily to scale or proportion. Accordingly, the particular dimensions and applications provided in the drawings presented herein are not to be considered limiting. FIGS. 1A and 1B show a rotor generally indicated at 10. The rotor 10 may be configured for use in an electric motor, which may be an alternating current (AC) induction motor. The electric motor may be included in a hybrid system to power a vehicle. The rotor 10 formed by the method described herein includes a rotor core generally indicated at 12 and a cast winding generally indicated at 32. The cast winding 32 may be referred to as a rotor frame or rotor cage, and may be configured as a type of winding known as a squirrel-cage.

The rotor core 12 may be configured as and/or referred to herein as a lamination stack. As shown in FIGS. 2A-2B, the lamination stack 12 may include a plurality of passages 26 which are radially distributed around and generally longitudinal to an axis 68 of the lamination stack 12 and rotor assembly 10. The lamination stack 12 may be formed from a plurality of laminations 20, which may be referred to as lamination sheets. Each lamination 20 includes a plurality of teeth 28 which define a plurality of slots 24. The plurality of slots 24 of each lamination 20 is oriented with respect to the plurality of slots 24 of each other lamination 20 in the lamination stack 12 to define the plurality of passages 26. During a casting process, molten metal 50 (see FIGS. 3 and 5A) is flowed into the passages 26 and solidified to form a plurality of conductor bars 18.

Each of the laminations 20 may include a key or other locating feature 22, which may be used to orient the laminations 20 with respect to each other. The laminations 20 may be retained in an oriented position to form the lamination stack 12 by a mechanical means such as point welding the laminations 20 to each other, or by being placed on an orienting fixture which may be a mandrel 42 (see FIGS. 3 and 5A). The mandrel 42 may be configured to position and/or locate the lamination stack 12 in a mold cavity 40 (see FIGS. 3 and 5A) during casting of the rotor frame 32 to form the rotor assembly 10. The lamination stack 12 includes a first end 64, a second end 66, and a peripheral surface 62 therebetween. The peripheral surface 62 comprises the outmost radial surfaces (with respect to the axis 68) of the plurality of teeth 28, such that the peripheral surface 62 may be generally cylindrical.

Referring again to FIGS. 1A and 1B, the rotor frame 32 includes a first end ring 14, a second end ring 16, and a plurality of conductor bars 18 formed as a single casting 30 (see FIGS. 3 and 5A), such that each of the plurality of conductor bars 18 is electrically connected to the first end ring 14 and to the second end ring 16 to form the rotor frame 32, e.g., the winding, of the rotor assembly 10. Each of the end rings 14, 16 defines a generally annular surface 72.

The method for forming the rotor assembly 10 may include preheating the lamination stack 12 to a predetermined temperature and positioning the preheated lamination stack 12 in a mold cavity 40 (see FIGS. 3 and 5A), where the mold cavity 40 includes a first mold portion 46 defining the first end ring 14 of the rotor frame 32 and a second mold portion 44 defining a second end ring 16 of the rotor frame 32. The mold cavity 40 includes an inner wall 58, which may be referred to as a peripheral cavity surface or cavity surface, intermediate between the mold portions defining the first and second end rings 14, 16. The cavity surface 58 is configured to generally conform to the peripheral surface 62 of the lamination stack 12.

Figure 4:
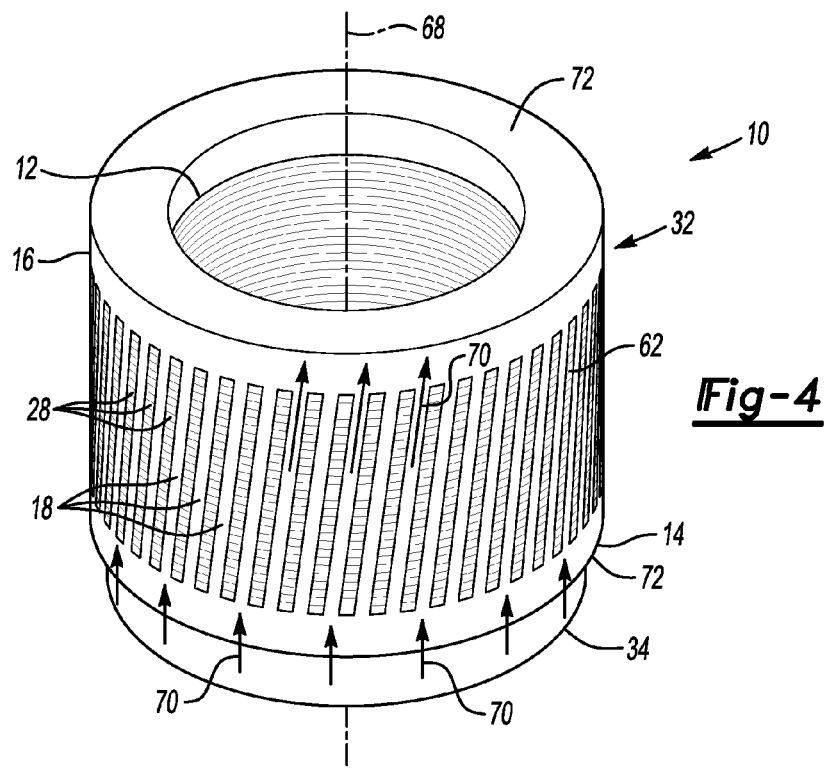
FIG. 4 is a schematic perspective view of the rotor casting formed using the mold of FIG. 3.

As shown in a first embodiment of the method for forming the rotor assembly 10 in FIGS. 3 and 4, and in a second embodiment of the method shown in FIGS. 5A, 5B and 6, the preheated lamination stack 12 may be positioned in the mold cavity 40 such that the peripheral surface 62 of the lamination stack 12 is in contact with the cavity surface 58 of the mold cavity 40. Further, each of the plurality of passages 26 is substantially enclosed along its longitudinal length by the cavity surface 58, and is open at either end such that each of the plurality of passages 26 is in fluid communication with the first mold portion 46 forming the first end ring 14 and the second mold portion 44 forming the second end ring 16 to define a conductor bar of the rotor frame. As described previously, a mandrel 42 may be configured to hold the lamination stack 12 in position in the mold 40 during the casting process.

Prior to introducing molten metal 50 into the mold cavity 40, a vacuum may be pulled on the mold cavity 40 which may remove air from the mold cavity 40, improve the flow of molten metal 50 through the plurality of passages 26, and/or reduce entrained air and porosity in the rotor frame 32.

As shown in FIGS. 3 and 5A, molten metal generally indicated at 50 is introduced into the mold cavity 40 quiescently, that is, at a velocity such that turbulent flow of the molten metal in the mold cavity is minimized. The lamination stack 12 is positioned in the mold cavity 40 such that the molten metal 50 flows simultaneously through the plurality of passages 26 prior to filling at least one of the first mold portion 46 and the second mold portion 44, e.g., the plurality of passages 26 are filled prior to forming at least one of the first end ring 14 and the second end ring 16. When the mold 40 is filled, the molten metal 50 is solidified to form the cast portion 30, including the rotor frame 32 comprising the rotor assembly 10. The cast portion 30 may include an ingate 38, a biscuit 34, and one or more runners 36. The molten metal 50 may be an electric grade alloy, which may be an aluminum-based material. In one example, the molten metal 50 may be a high purity aluminum, such as AL99.7.

In one example, the lamination stack 12 may be preheated to a predetermined temperature between 200 degrees Centigrade and 500 degrees Centigrade, and may preferably be preheated to at least 350 degrees Centigrade. The predetermined temperature may be sufficiently high to slow the solidification of the molten metal 50 as the molten metal 50 flows through the plurality of passages 26, by reducing the thermal gradient between the molten metal 50 and the heated rotor core 12, thereby enhancing the flow of the molten metal 50 through the plurality of passages 26. By preheating the lamination stack 12 to reduce the thermal gradient, shrinkage porosity, discontinuities such as folds and cold shuts, and thermal stresses in the conductor bars 18 may be minimized or substantially eliminated. The mold cavity 40 may also be preheated to reduce the thermal gradient between the cavity 40, the core 12 and the molten metal 50 to minimize the formation of casting discontinuities. In one example, the mold cavity 40 and the preheated lamination stack 12 may be generally at the same temperature when the molten metal 50 is introduced to the mold cavity 40.

The biscuit 34 formed in the mold cavity 40 may be configured to entrap and/or collect entrained air and other impurities from the molten metal 50 as the molten metal 50 is introduced into the mold cavity 40, to minimize porosity in the rotor frame 32, and to remove inclusions, oxides or other impurities to prevent their formation and/or the formation of other discontinuities in the rotor frame 32 during the casting process. The molten metal 50 may flow through the portion of the mold cavity 40 defining the biscuit 34 prior to flowing into the plurality of passages 26.

The molten metal 50 may be flowed through the plurality of passages 26 such that impurities, which may include but are not limited to entrained air and oxides, are displaced from and/or pushed out of the plurality of passages 26 by the flow of molten metal 50, such that the plurality of conductor bars 18 are formed with minimal porosity, oxides, and/or other discontinuities which may be detrimental to the conductivity of the conductor bars. For example, air may be pushed from the plurality of passages 26 by the molten metal 50 and vented from the mold cavity 40 to minimize porosity in the cast rotor frame 32.

By flowing the molten metal 50 through the plurality of passages 26 prior to flowing the molten metal 50 into at least one of the first end ring 14 or second end ring 16 portions of the mold cavity 40, such that entrained air, oxides, and other impurities are pushed out of the passages, the conductivity of the conductor bars 18 can be optimized by minimizing the occurrence of porosity and oxides. The mold cavity 40 may be vented or configured for overflow such that impurities including entrained air may be removed from the mold cavity 40 and rotor frame 32 formed therein. One or more vents or overflows, indicated at 52 in FIGS. 3 and 5A, may be provided to remove the impurities from the mold cavity 40. By way of example, the vents and/or overflows 52 may be in fluid communication with one of a parting line 54 and/or a pressurizing feature 48, such as an ejection pin or intensification ring, of the mold cavity 40.

By minimizing the impurities in the cast rotor frame 32, the conductivity of the rotor frame 32 can be improved and/or optimized, such that the conductivity of the rotor frame 32 may exceed 55% IACS (International Annealed Copper Standard), e.g., may exceed the conductivity of 40-45% IACS typically achieved using a conventional high pressure die casting (HPDC) method to form the rotor frame 32. For example, the conductivity of a cast rotor frame 32 formed from near pure aluminum Al99.7 using the method described herein may approach 60% IACS. Further, by distributing most of those impurities (porosity, oxides, inclusions, etc.) which may be formed within the end rings 14, 16, and minimizing or substantially eliminating the formation of impurities in the conductor bars 18, any detrimental impact of the impurities on conductivity of the rotor frame 32 may be minimized.

After filling the mold cavity 40, the molten metal 50 may be pressurized during solidification of the rotor frame casting 32, by using a pressurizing feature 48, which may be, for example, an intensification ring or ejection pin in communication with at least one of the first end ring 14 and the second end ring 16 in the mold cavity 40.

After solidification of the molten metal 50 to form the cast portion 30, secondary operations may be performed to remove the ingate 38, the biscuit 34, one or more runners 36, flash, etc. from the cast portion 30 to provide the rotor assembly 10. Additional finishing operations, which may include machining or other surface treatments, may be performed on the rotor frame casting 32 to complete fabrication of the rotor assembly 10.

In the first embodiment shown in FIGS. 3 and 4, a mold cavity 40 may be configured such that the rotor core 12 is generally oriented vertically with respect to the flow of the molten metal 50 into the mold cavity 40 in a direction generally indicated by the arrows 70 in FIG. 4, through the first end ring portion 14 and through the plurality of passages 26 prior to flowing into the second end ring portion 16, and such that the rotor frame 32 is formed as a single casting, e.g., the single casting is formed by filling the mold cavity 40 continuously from a single ingate 38 such that a singular quiescent unidirectional flow of molten metal fills the mold in a manner such that knit lines, hot tears, cold shuts or other discontinuities which may result from converging flows of molten metal are substantially absent from, e.g., insignificant and/or not present in the rotor frame casting 30, including the transition area between a conductor bar 18 and an end ring 14, 16. The method as shown in FIG. 3 may include flowing the molten metal 50 into the first mold portion 46, e.g., the portion defining the first end ring 14, of the mold cavity 40 through an ingate 38 in fluid communication with the first mold portion 46 defining the first end ring 14. The ingate 38 may be configured as a ring-type ingate with a generally ring-shaped cross-section similar in cross-sectional shape to the generally annular surface 72 of the end ring 14. The ingate 38 may include a generally annular opening 74 interfacing with the generally annular surface 72. The molten metal 50 flows through the ingate 38 and the first mold portion 46 to fill the first end ring 14, and to simultaneously fill the plurality of passages 26. The plurality of passages 26 are filled with molten metal 50 prior to filling the second mold portion 44 to form the second end ring 16. As described previously, the molten metal 50 pushes entrapped air and displaces impurities from the plurality of passages 26 as it flows toward the second mold portion 44, such that the plurality of conductor bars 18 may be formed with minimal porosity, oxides, inclusions and/or other discontinuities and such that all portions of the mold cavity 40 may be filled from a single glow of molten metal 50 introduced to the mold cavity through the ingate 38. Air and/or other impurities may be vented through a vent or overflow 52, which may be proximate to a parting line 54 or pressurizing element 48 of the mold cavity 40.

As shown in FIG. 3, the lamination stack 12 may be positioned in the mold cavity 40 on a mandrel 42. The mandrel 42 may be proximate to the ingate 38 and configured to collect entrained air and oxides from the molten metal 50 in a biscuit 34 defined by a surface 56 of the mandrel 42. The surface 56 of the mandrel 42 may be of a generally concave and/or conical shape, defined, for example, by an angle θ. The surface 56 may define a generally convex and/or conical portion 60 of the biscuit 34, wherein the entrained air, oxides and/or other impurities may be collected in the generally convex portion 60 of the biscuit 34.

In a second embodiment shown in FIGS. 5A, 5B and 6, a mold cavity 40 may be configured such that the rotor core 12 is generally oriented horizontally with respect to the flow of the molten metal 50 into the mold cavity 40 in a direction generally indicated by the arrows 70 in FIGS. 5B and 6. The method may include flowing the molten metal 50 through a ring-type ingate 38 which may be located in the mold cavity 40 intermediate between the first mold portion 46 and the second mold portion 44 and in fluid communication with the plurality of passages 26, and such that the rotor frame 32 is formed as a single casting, e.g., the single casting is formed by filling the mold cavity 40 continuously from a single ingate 38 such that a singular quiescent flow of molten metal fills the mold in a manner such that knit lines, hot tears, cold shuts or other discontinuities which may result from converging flows of molten metal are substantially absent from, e.g., insignificant and/or not present in the rotor frame casting 30, including the transition area between a conductor bar 18 and an end ring 14, 16. The ring-type ingate 38 may be located approximately at the midpoint between the first end ring 14 and the second end ring 16, as shown in FIGS. 5A and 6. The ring-type ingate 38 may include an opening 74 which may substantially conform to the peripheral surface 62 of the lamination stack 12 and through which the molten metal 50 may flow simultaneously into the plurality of passages 26 enclosed by the cavity surface 58, as shown in FIGS. 5B and 6. For example, the ingate opening 74 may be a generally annular opening having an inner diameter which is substantially the same as the outer diameter of the lamination stack 12 such that the ingate 38 substantially conforms to the peripheral surface 62.

The molten metal 50 may flow into the mold cavity 40 through a biscuit portion 34 and a runner 36 to an ingate 38. The biscuit portion 34 may be configured to entrap and/or collect entrained air, oxides, or other inclusions in the molten metal 50, prior to the molten metal reaching the portion of the mold cavity 40 defining the rotor frame 32, to reduce and/or minimize the porosity and/or discontinuities formed in the rotor frame 32. As shown in FIG. 6, the molten metal 50 flows in the direction of arrows 70 such that the plurality of passages 26 is filled with molten metal 50 prior to forming the end rings 14, 16. As previously discussed, the molten metal 50 may push and/or displace entrapped air and/or other impurities from the plurality of passages 26 such that the conductor bars 18 cast therein are formed with minimal porosity and/or inclusions or oxides. Air and/or impurities displaced from the passages 26 and/or end rings 14, 16 may be vented or overflowed from the mold cavity 40 through one or more vents or overflows 52, which may be proximate to a pressurizing element 48 which may be an intensification ring, an ejection element, or other pressurizing element. One or more pressurizing elements 48, as described previously, may be placed in proximate contact with the first end ring 14 and/or the second end ring 16 to apply pressure to the molten metal 50 during solidification thereof, to reduce porosity due to entrapped air and/or shrinkage porosity, in the rotor frame 32.

The rotor assembly 10 formed by the method described herein includes a rotor frame 32 formed of a single casting made of an electric grade alloy and including a plurality of conductor bars 18, a first end ring 14, and a second end ring 16. The single casting forming the rotor frame 32 is characterized by an absence of knit lines, hot tears, joints or other discontinuities, between, for example, a conductor bar 18 and one or both of the end rings 14, 16. The flow of molten metal 50 through the plurality of passages 26 prior to formation of at least one of the end rings provides a cast structure which in the conductor bars 18 is characterized by minimal, e.g., insignificant, levels of porosity and oxides and which in the end rings 14, 16 is characterized by very low levels of porosity and oxides, especially in comparison to a cast structure formed by a conventional HPDC process, as shown in Table 1. By way of example, Table 1 compares the entrained air and oxides in the cast aluminum rotor 10 formed using the method described herein and as shown in FIGS. 3 and 4, to a cast aluminum rotor (not shown) formed using a conventional high pressure die casting (HPDC) method. As shown in Table 1, the amount of entrained air and oxide inclusions may be significantly reduced using the method described herein. As shown in Table 1, the plurality of conductor bars 18 of the rotor frame 32 may have an entrained air volume fraction of significantly less than 0.0001%, such that porosity may be substantially eliminated from the conductor bars, and may include less than 25 cm$^2$ oxides in the conductor bars, where in the example shown, the conductor bars have an approximate total volume of 170 cm$^3$.

TABLE 1

| Method | Oxides (cm$^2$) | | Entrained Air Volume Fraction (%) | | Equivalent Circle Diameter (ECD) of the Largest Entrained Air Bubble (μm) | |
| --- | --- | --- | --- | --- | --- | --- |
| | Bars | End Rings | Bars | End Rings | Bars | End Rings |
| Conventional HPDC | 251 | 1199 | 2.9 | 4.8 | 208 | 685 |
| As shown in FIGS. 3-4 | 21 | 744 | 0.0 | 1.5 | 10.5 | 89.6 |

The significantly reduced level of porosity and oxides present in the rotor frame 32, including the negligible level of porosity and minimal level of oxides present in the conductor bars 18, may contribute to an increase in the conductivity of the rotor frame 32 and especially the conductivity of the conductor bars 18. The integrity of the rotor frame 32, which may be characterized by the mechanical strength and durability of the rotor frame 32, may be increased by the absence of a significant amount of porosity or oxide formation, for example, by comparison to a cast structure formed by a conventional HPDC process.

The detailed description and the drawings or figures are supportive and descriptive of the invention, but the scope of the invention is defined solely by the claims. While some of the best modes and other embodiments for carrying out the claimed invention have been described in detail, various alternative designs and embodiments exist for practicing the invention defined in the appended claims.

The invention claimed is:

1. A method for forming a rotor assembly including a lamination stack and a cast rotor frame, the method including:
    preheating the lamination stack to a predetermined temperature, wherein the lamination stack defines a plurality of passages;
    positioning the preheated lamination stack in a mold cavity including a first mold portion defining a first end ring of the rotor frame, a second mold portion defining a second end ring of the rotor frame, and a cavity surface therebetween;
    wherein the preheated lamination stack is positioned in the mold cavity such that a peripheral surface of the lamination stack including the plurality of passages is in contact with the cavity surface of the mold cavity and the plurality of passages are in fluid communication with the first mold portion and the second mold portion to define a plurality of conductor bars of the rotor frame;
    introducing molten metal into the mold cavity at a velocity such that turbulent flow of the molten metal in the mold cavity is minimized, and such that the molten metal flows simultaneously through the plurality of passages prior to forming at least one of the first end ring and the second end ring; and
    solidifying the molten metal.

2. The method of claim 1, further comprising:
    pressurizing the molten metal during solidification of the rotor frame.

3. The method of claim 1, further comprising:
    pressurizing the molten metal using a pressurizing element in communication with at least one of the first end ring and the second end ring.

4. The method of claim 1, wherein the predetermined temperature is between 200 degrees Centigrade and 500 degrees Centigrade.

5. The method of claim 1, wherein the predetermined temperature is at least 350 degrees Centigrade.

6. The method of claim 1, wherein the predetermined temperature is sufficiently high to slow the solidification of the molten metal as the molten metal flows through the plurality of passages.

7. The method of claim 1, further comprising:
    preheating the mold cavity such that the preheated mold cavity and the preheated lamination stack are generally the same temperature when the molten metal is introduced to the mold cavity.

8. The method of claim 1, wherein the flow of molten metal through the plurality of passages displaces impurities from the plurality of passages such that the formation of porosity and oxides in the plurality of conductor bars is minimized.

9. The method of claim 1, further comprising:
    forming a biscuit configured to collect entrained air and impurities from the flow of molten metal.

10. The method of claim 1, further comprising:
    pulling the mold cavity in vacuum prior to introducing molten metal into the mold cavity.

11. The method of claim 1, further comprising:
    venting air pushed from the plurality of passages by the molten metal out of the mold cavity to minimize porosity in the cast rotor frame.

12. The method of claim 11, wherein the air is vented through a vent in fluid communication with one of a parting line and a pressurizing feature of the mold cavity.

13. The method of claim 1, wherein the molten metal flows into the first mold portion of the mold cavity through a ring-type ingate in fluid communication with the first mold portion to simultaneously fill the plurality of passages prior to filling the second mold portion of the mold cavity.

14. The method of claim 1, wherein the mold cavity includes a mandrel proximate to the ingate and configured to collect entrained air and oxides from the molten metal in a biscuit defined by a surface of the mandrel.

15. The method of claim 14, wherein:
    the surface of the mandrel is of a generally concave shape defining a generally convex portion of the biscuit;
    and the entrained air and oxides are collected in the generally convex portion of the biscuit.

16. The method of claim 1, wherein the molten metal flows through a ring-type ingate located intermediate between the first end ring and the second end ring, and in fluid communication with the plurality of passages.

17. The method of claim 16, wherein the ring-type ingate includes an opening conforming to the peripheral surface of the lamination stack and through which the molten metal flows into the plurality of passages.

18. A method for forming a rotor assembly including a rotor core and a cast winding, the method including:
  heating a rotor core to a minimum temperature, wherein the rotor core includes a plurality of generally longitudinal passages;
  positioning the heated rotor core in a mold cavity such that each of the plurality of passages is in fluid communication with the mold cavity;
  wherein the mold cavity and the plurality of passages define a rotor winding including a plurality of conductor bars;
  quiescently flowing molten metal through a ring-type ingate and simultaneously into each of the plurality of passages prior to flowing molten metal into a mold portion to form at least one of a first end ring and a second end ring,
  wherein the flow of molten metal displaces impurities from the plurality of passages;
  pressurizing the molten metal during solidification to reduce shrinkage porosity in the winding; and
  solidifying the molten metal to form the winding.

\* \* \* \* \*